(12) United States Patent
Motamedhashemi

(10) Patent No.: US 10,508,314 B2
(45) Date of Patent: Dec. 17, 2019

(54) METHODS AND SYSTEMS FOR INCREASING THE CARBON CONTENT OF SPONGE IRON IN A REDUCTION FURNACE

(71) Applicant: Mirmohammadyousef Motamedhashemi, Charlotte, NC (US)

(72) Inventor: Mirmohammadyousef Motamedhashemi, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 161 days.

(21) Appl. No.: 15/270,692

(22) Filed: Sep. 20, 2016

(65) Prior Publication Data

US 2017/0009309 A1 Jan. 12, 2017

Related U.S. Application Data

(63) Continuation-in-part of application No. 14/748,413, filed on Jun. 24, 2015, now Pat. No. 10,316,376.

(51) Int. Cl.
*C21B 13/00* (2006.01)
*C01B 32/40* (2017.01)
(Continued)

(52) U.S. Cl.
CPC .......... *C21B 13/0073* (2013.01); *B01D 53/62* (2013.01); *C01B 32/40* (2017.08);
(Continued)

(58) Field of Classification Search
CPC ............ C21B 13/0073; C21B 2100/02; C21B 2100/04; C21B 2100/22; C21B 2100/20;
(Continued)

(56) References Cited

U.S. PATENT DOCUMENTS 2,740,706 A * 4/1956 Paull .......................... C01B 3/22
75/495
3,375,098 A * 3/1968 Marshall ................... C21B 5/06
266/139
(Continued)

FOREIGN PATENT DOCUMENTS

DE         19538591 C1    4/1997
DE      102012014904    *  1/2014
(Continued)

OTHER PUBLICATIONS

Noble, David R. et al. "Syngas Mixture Composition Effects upon Flashback and Blowout." Proceedings of GT2006 ASME Turbo Expo 2006: Power for Land, Sea, and Air. May 8-11, 2006 Barcelona, Spain. GT2006-90470. (Year: 2006).*
(Continued)

*Primary Examiner* — Tima M. McGuthry-Banks
(74) *Attorney, Agent, or Firm* — Clements Bernard Walker; Christopher L. Bernard

(57) ABSTRACT

A method for producing direct reduced iron having increased carbon content, comprising: providing a carbon monoxide-rich gas stream; and delivering the carbon-monoxide-rich gas stream to a direct reduction furnace and exposing partially or completely reduced iron oxide to the carbon monoxide-rich gas stream. The carbon monoxide-rich gas stream is delivered to one or more of a transition zone and a cooling zone of the direct reduction furnace. Optionally, providing the carbon monoxide-rich gas stream comprises initially providing one of a reformed gas stream from a reformer and a syngas stream from a syngas source. Optionally, the carbon monoxide-rich gas stream is derived from a carbon monoxide recovery unit that forms the carbon monoxide-rich gas stream and an effluent gas stream. Optionally, the method still further includes providing a
(Continued)

hydrocarbon-rich gas stream to one or more of a transition zone and a cooling zone of the direct reduction furnace.

14 Claims, 3 Drawing Sheets

(51) Int. Cl.
*B01D 53/62* (2006.01)
*F25J 3/02* (2006.01)

(52) U.S. Cl.
CPC ............ *F25J 3/0261* (2013.01); *F25J 3/0271* (2013.01); *C21B 2100/22* (2017.05)

(58) Field of Classification Search
CPC ........ B01D 53/62; C01B 32/40; F25J 3/0271; F25J 3/0261
USPC .................................................... 75/496, 505
See application file for complete search history.

(56) References Cited

U.S. PATENT DOCUMENTS

| | | | |
|---|---|---|---|
| 4,054,444 A | 10/1977 | Clark et al. | |
| 4,150,972 A * | 4/1979 | Price-Falcon | C21B 13/0073 75/494 |
| 4,160,663 A * | 7/1979 | Hsieh | C01B 3/12 75/495 |
| 4,224,057 A | 9/1980 | Martinez-Vera et al. | |
| 4,584,016 A | 4/1986 | Becerra-Novoa et al. | |
| 4,702,766 A | 10/1987 | Love et al. | |
| 4,734,128 A | 3/1988 | Becerra-Novoa et al. | |
| 4,752,329 A | 6/1988 | Freeland et al. | |
| 4,854,967 A | 8/1989 | Hauk | |
| 5,618,032 A * | 4/1997 | Meissner | C21B 13/02 266/80 |
| 6,048,382 A * | 4/2000 | Greenwalt | C21B 13/0086 75/436 |
| 6,506,230 B2 * | 1/2003 | Montague | C01B 3/363 75/381 |
| 7,931,731 B2 * | 4/2011 | Van Heeringen | B01D 53/229 75/505 |
| 9,868,999 B2 * | 1/2018 | Cheeley | C21B 13/02 |
| 2009/0193846 A1 * | 8/2009 | Foral | C01B 3/506 62/620 |
| 2009/0293539 A1 * | 12/2009 | Briglia | C01B 3/506 62/625 |
| 2012/0125157 A1 | 5/2012 | Duarte-Escareno et al. | |

FOREIGN PATENT DOCUMENTS

| | | |
|---|---|---|
| EP | 0179734 A2 | 4/1986 |
| JP | 62-202007 A | 9/1987 |

OTHER PUBLICATIONS

Couto, Nuno et al. "Influence of the Biomass Gasification Processes on the Final Composition of Syngas." Energy Procedia 36 pp. 596-606. doi: 10.1016/j.egypro.2013.07.068 (Year: 2013).*

DE 102012014904 A1 machine translation of the description (Year: 2014).*

Feb. 3, 2017 International Search Report issued in International Patent Application No. PCT/US2016/053676.

* cited by examiner

METHODS AND SYSTEMS FOR INCREASING THE CARBON CONTENT OF SPONGE IRON IN A REDUCTION FURNACE

CROSS-REFERENCE TO RELATED APPLICATION

The present patent application/patent is a continuation-in-part (CIP) of copending U.S. patent application Ser. No. 14/748,413, filed on Jun. 24, 2015, and entitled "METHODS AND SYSTEMS FOR INCREASING THE CARBON CONTENT OF SPONGE IRON IN A REDUCTION FURNACE," the contents of which are incorporated in full by reference herein.

FIELD OF THE INVENTION

The present invention relates generally to methods and systems for increasing the carbon content of sponge iron in a direct reduction (DR) furnace.

BACKGROUND OF THE INVENTION

Direct reduced iron (DRI), which is also referred to as sponge iron, is typically produced by the reaction of iron ore in a reactive gas stream containing reducing agents, such as $H_2$ and CO, in a moving bed or vertical shaft reactor. The following are the equilibrium-limited global reactions:

$$Fe_2O_3 + 3H_2 \Leftrightarrow 2Fe + 3H_2O \quad (1)$$

$$Fe_2O_3 + 3CO \Leftrightarrow 2Fe + 3CO_2 \quad (2)$$

In commercial DR processes, the product DRI still contains unreacted iron oxide, which may be as high as 15.0% by weight. Due to the equilibrium-limited nature of reactions (1) and (2), it is not economical to achieve complete (i.e. 100.0%) reduction within the reduction reactor. In fact, when the degree of reduction approaches 100.0%, an excessively long residence time inside the reduction reactor is required to remove the remaining oxygen from the partially reacted material. While the rate of reduction reactions can be increased to some extent by increasing temperature, such temperature increases are limited by the fact that the operating temperature must be kept below the sintering temperature so that clusters are not formed inside the reduction reactor. Thus, the typical reduction is maintained somewhere in the 85.0-95.0% range at the discharge of conventional commercial reduction reactors, depending on the quality of the oxide material and plant operating conditions.

Such product DRI can be used as a source of low-residual iron, in addition to ferrous scrap and pig iron in the production of steel, mainly through an electric arc furnace (EAF) in a steelmaking facility. The EAF melts that charged material by means of an electric arc, typically accompanied by the injection of oxygen in order to burn impurity carbon and $Fe_3C$, if any. The partial or complete combustion of the carbon with oxygen provides a uniform internal source of energy for the EAF when the oxygen is injected into the EAF. Furthermore, the conversion of $Fe_3C$ into iron and carbon is an exothermic reaction, which improves the thermal efficiency of the EAF. Therefore, the carbon content of the DRI can be interpreted as an energy source, and this energy is finally utilized in the EAF when the DRI is melted.

Although other carbon sources, like coal or rubber, can be added to the EAF for the same purpose, the resulting yield is significantly less than the combined carbon in the DRI, due to particle blow-off and impurities in the carbon sources. Therefore, it is highly desirable to increase the carbon content of DRI during the reduction step before discharging it into the EAF.

Inside the reduction reactor, carbon can be generated (i.e. physical carbon—C) or added to the DRI (i.e. chemical carbon—$Fe_3C$) through the following global reactions:

$$3Fe + CO + H_2 \Leftrightarrow Fe_3C + H_2O \quad (3)$$

$$3Fe + 2CO \Leftrightarrow Fe_3C + CO_2 \quad (4)$$

$$3Fe + CH_4 \Leftrightarrow Fe_3C + 2H_2 \quad (5)$$

$$CO + H_2 \Leftrightarrow C + H_2O \quad (6)$$

$$2CO \Leftrightarrow C + CO_2 \quad (7)$$

$$CH_4 \Leftrightarrow C + 2H_2 \quad (8)$$

Therefore, two major sources of combined carbon in product DRI (i.e. physical and chemical) are CO and hydrocarbons (e.g. $CH_4$) in the reducing gas stream. While the amount of CO in the reducing gas stream is normally set by the operating conditions of the reducing gas generation unit, the amount of hydrocarbons is adjusted by the operator to suppress methanation reactions inside the reduction furnace, while considering the cooling effects caused by:
- Endothermic reactions (5) and (8) above,
- Endothermic reforming reactions catalyzed by iron within the reduction reactor,
- Direct heat removal by the hydrocarbons, which have noticeably higher heat capacities as compared to most of the gases in a DR plant, and
- Limited preheat temperatures for hydrocarbon streams (below ~400 degrees C.).

In other words, from an operational point of view, there are limitations to increase the amounts of CO and $CH_4$ in the reducing gas stream.

One of the commercially practiced approaches for bypassing these limitations is the addition of a hydrocarbon-rich stream to the bulk of the already reduced materials. This is usually done by injecting natural gas into the hot reduced material (a good catalyst) once it leaves the reduction zone—a region typically called the transition zone. Thus, due to cracking reactions in the transition zone, the carbon content of the product increases.

Due to the endothermic nature of the cracking reactions, this interaction lowers the material and gas temperatures, thus helping to cool the product DRI. However, this cooling effect for plants where the DRI has to leave the reduction furnace at elevated temperatures, is viewed as a negative side effect, and is typically minimized.

In commercialized DR processes, a hydrocarbon source is normally utilized to produce the reducing agents via a catalytic or non-catalytic reforming process. For catalytic reforming processes, the required oxidants are typically $H_2O$ (i.e. steam) and $CO_2$. For non-catalytic reforming processes, the required oxidant is typically oxygen ($O_2$). In the latter case, very fast partial and complete combustion reactions generate $H_2O$ and $CO_2$ for further homogeneous and/or heterogenous reforming reactions. All reforming processes convert some portion of the carbon and hydrogen contents of the hydrocarbons into CO and $H_2$, respectively. For instance, in the case of $CH_4$ being the only hydrocarbon source, the global reaction schemes governing the homogenous and heterogenous reforming processes are:

$$CH_4 + 2O_2 \Leftrightarrow CO_2 + 2H_2O \quad (9)$$

$$CH_4 + 1.5O_2 \Leftrightarrow CO + 2H_2O \quad (10)$$

$$CH_4 + O_2 \Leftrightarrow CO + H_2 + H_2O \quad (11)$$

$$CH_4 + 0.5O_2 \Leftrightarrow CO + 2H_2 \quad (12)$$

$$CH_4 + H_2O \Leftrightarrow CO + 3H_2 \quad (13)$$

$$CH_4 + CO_2 \Leftrightarrow 2CO + 2H_2 \quad (14)$$

The gas leaving the reforming process is therefore a mixture of CO, $H_2$, and unreacted hydrocarbons and oxidants, and is called the reformed gas.

Alongside these main reactions, depending on the thermodynamics of the system, some of the previously mentioned reactions can also occur, the major of which are:

$$CO + H_2 \Leftrightarrow C + H_2O \quad (6)$$

$$2CO \Leftrightarrow C + CO_2 \quad (7)$$

$$CH_4 \Leftrightarrow C + 2H_2 \quad (8)$$

The resulting carbon from these side reactions creates detrimental consequences for the reforming catalyst, and, therefore, it is a common practice to prevent their occurrence by controlling the operating parameters of the reformer unit.

Based on reactions (1) and (2), the presence of oxidants $H_2O$ and $CO_2$ in the reducing gas mixture reduces the efficiency of the reduction reactions. Consequently, operating parameters in the reforming section of the plant are adjusted in such a way that the reformed gas has high values of $CO/CO_2$ and $H_2/H_2O$, which can be achieved by a high conversion rate for $CH_4$, while maintaining the concentrations of $H_2O$ and $CO_2$ to the lowest extent possible in the feed gas to the reforming unit. Typically, $CH_4$ slip from the reformer unit is maintained below ~1.0-2.0%, and, as a result, similar to $CO/CO_2$ and $H_2/H_2O$, the $H_2/CH_4$ ratio in the reformed gas stream is high. While a high $CO/CO_2$ ratio in the reformed gas stream favors carbon deposition inside the reduction reactor according to reactions (4) and (7), a high $H_2/CH_4$ ratio diminishes the chance of carbon deposition according to reactions (5) and (8). Thus, it is clear that by increasing the $CO/CO_2$ ratio, the carburization potential of the reformed gas improves. This is the main focus of the present invention.

BRIEF SUMMARY OF THE INVENTION

The present invention makes use of industrially available technologies, i.e. membrane modules (organic/inorganic/organometallic) by which a majority of the hydrogen and or $CO_2$ are recovered from a reformed gas stream in a plant via the rejection (i.e. separation) of other components. Such separation typically results in two different streams with distinct chemical compositions: one rich in CO and the other rich in $H_2$. The $H_2$-rich gas stream then blends with different gas streams in the process, including, but not limited to, the feed gas stream to the reformer unit, the cooling gas stream, the reducing gas stream, the fuel gas streams, etc. The CO-rich gas stream flows into the transition zone and/or the cooling zone of the reduction furnace to increase the carbon content of the sponge iron. The exothermic nature of reactions (4) and (7) permits the addition of more gas into the transition zone to keep the temperature high. Optionally, a hydrocarbon-rich gas stream is blended with the CO-rich gas stream prior to the final injection port.

Hundreds of membrane modules have been installed around the world by different vendors in oil refineries and petrochemical plants, where the recovery of hydrogen, the separation of $CO_2$, or the adjustment of the $H_2/CO$ ratio is important for the efficient operation of the plant. Thus, there is little impediment to employing such equipment in a novel manner in a DR plant.

The present invention is not limited to the use of membrane modules. All other separation/adsorption technologies (e.g. pressure/vacuum pressure/temperature swing adsorption (PSA/VPSA/TSA) units) meeting process requirements can be used to accomplish the carburization task of the present invention based on the guidelines presented.

In one exemplary embodiment, the present invention provides a method for producing direct reduced iron having increased carbon content, comprising: providing a reformed gas stream from a reformer; delivering the reformed gas stream to a carbon monoxide recovery unit to form a carbon monoxide-rich gas stream and a hydrogen-rich gas stream; and delivering the carbon monoxide-rich gas stream to a direct reduction furnace and exposing partially or completely reduced iron oxide to the carbon monoxide-rich gas stream to increase the carbon content of resulting direct reduced iron. The carbon monoxide-rich gas stream is delivered to one of a transition zone and a cooling zone of the direct reduction furnace. The reformed gas stream, generated in a tubular catalytic reformer in direct reduction plants, typically comprises 50.0-80.0% $H_2$, 20.0-40.0% CO, 1.0-5.0% $CO_2$, 0.0-3.0% $CH_4$, and 0.0-5.0% $N_2$, all dry bases, depending on the operating conditions of the reformer. The method further comprises cooling the reformed gas stream to less than its saturation temperature, preferably ambient temperature, e.g. 20-50 degrees C. in a cooler/chiller. The method further comprises compressing the reformed gas stream to a pressure of 5.0-20.0 barg, preferably 10.0-15.0 barg, in a single or multi-stage compressor set before flowing into the CO recovery unit. In order to have a better efficiency, the carbon monoxide-rich gas stream leaving the CO recovery unit should comprise more than 60.0% carbon monoxide, preferably between 70.0-90.0%. The method further comprises recycling the hydrogen-rich gas stream for use in a direct reduction plant for different potential applications, including, but not limited to, fuel for combustion applications, feed gas to the reformer, and reducing gas to the reduction furnace. In the case of using the hydrogen-rich stream as a fuel, it reduces the amount of $CO_2$ released to atmosphere. The method further comprises mixing the carbon monoxide-rich gas stream with a hydrocarbon-rich gas stream, preferably natural gas, to form the final carburizing gas.

The hydrocarbon-rich gas stream should comprise more than 80.0% hydrocarbon. Optionally, depending on the chemical composition of the hydrocarbon-rich gas stream, the method comprises one or more of a dehumidifier and a mist-eliminator/saturator for reducing the humidity of the hydrocarbon-rich gas stream to below 1.0%, and preferably dry it. Optionally, depending on the chemical composition of the hydrocarbon-rich gas stream, the method comprises one desulfurization step to drop the sulfur content of the hydrocarbon-rich stream to less than 100 ppm, preferably to less than 10 ppm. Optionally, depending on the mixing ratio between the hydrocarbon-rich stream and CO-rich stream, the system comprises a preheater for elevating the temperature of the final carburizing gas to a temperature of not more than 400 degrees C., preferably somewhere between 50 and 300 degrees C. The method further comprises injection of the final carburizing gas onto the bulk of the already reduced materials inside the reduction reactor.

In another exemplary embodiment, the present invention provides a method for producing direct reduced iron having increased carbon content, comprising: providing a carbon monoxide-rich gas stream; and delivering the carbon-monoxide-rich gas stream to a direct reduction furnace and exposing partially or completely reduced iron oxide to the carbon monoxide-rich gas stream to increase the carbon content of resulting direct reduced iron. The carbon monoxide rich gas stream delivered to the direct reduction furnace comprises at least 60% CO prior to being mixed with any other gas stream. The carbon monoxide-rich gas stream is delivered to one or more of a transition zone and a cooling zone of the direct reduction furnace. Optionally, providing the carbon monoxide-rich gas stream comprises initially providing one of a reformed gas stream from a reformer (such as a catalytic reformer (for example, a tubular reformer), a non-catalytic reformer (for example, a partial oxidation reactor), or a combination reformer (for example, an auto-thermal reformer or a two-stage reformer) and a syngas stream from a syngas source (such as a gasifier, a coke oven gas source, or a blast furnace). Optionally, the carbon monoxide-rich gas stream is derived, at least in part, from a carbon monoxide recovery unit that forms the carbon monoxide-rich gas stream and an effluent gas stream. The carbon monoxide rich gas stream leaving the carbon monoxide recovery unit comprises at least 60% CO. Optionally, the carbon monoxide recovery unit is operated in parallel with a bypass line, the carbon monoxide recovery unit and the bypass line each providing a portion of the carbon monoxide-rich gas stream. Optionally, the method also includes recycling the effluent gas stream for use in a direct reduction plant. Optionally, the method further includes providing a hydrocarbon-rich gas stream to the direct reduction furnace with the carbon monoxide-rich gas stream. Optionally, the method still further includes providing a hydrocarbon-rich gas stream to one or more of a transition zone and a cooling zone of the direct reduction furnace.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

The present invention provides an efficient and cost effective process for increasing the carbon content of DRI in a DR plant. It provides a carbon monoxide-rich stream with limited impurities that is directly injected into the bulk of hot and partially or completely reduced materials inside the reduction furnace, or first blended with other gases (e.g. a hydrocarbon-rich gas stream). The combination of coking reactions noticeably increases the carbon content of the resulting DRI, while keeping the temperature of the bulk high.

For a DR plant utilizing a reforming step, of any type, the following are the main advantages:

The design is simple and straightforward with respect to engineering, construction, and operation.

The conventional method of injecting a hydrocarbon-rich stream into the reduction furnace increases the carbon content of the material by endothermic hydrocarbon cracking reactions; hence lowering the material temperature. The present invention, however, boosts the carbon content of the iron via an exothermic reaction that keeps the reduction zone hot, yielding improved plant productivity. This is a plus for DR plants producing hot-discharged DRI.

The process utilizes relatively little equipment.

The process can be incorporated into either cold or hot-discharged DRI plants.

Various vendors have already commercialized the individual components utilized, and their design and operation in other contexts are well documented.

The required CAPEX and OPEX for the proposed system are reasonable.

Integrating the present invention into existing DR plants does not affect the normal operation of such plants.

The design can be added as a supplemental plug-in package for existing DR plants.

There is no combustion/reaction associated with the design. Thus, its operation is quite safe and reliable.

Figure 1:
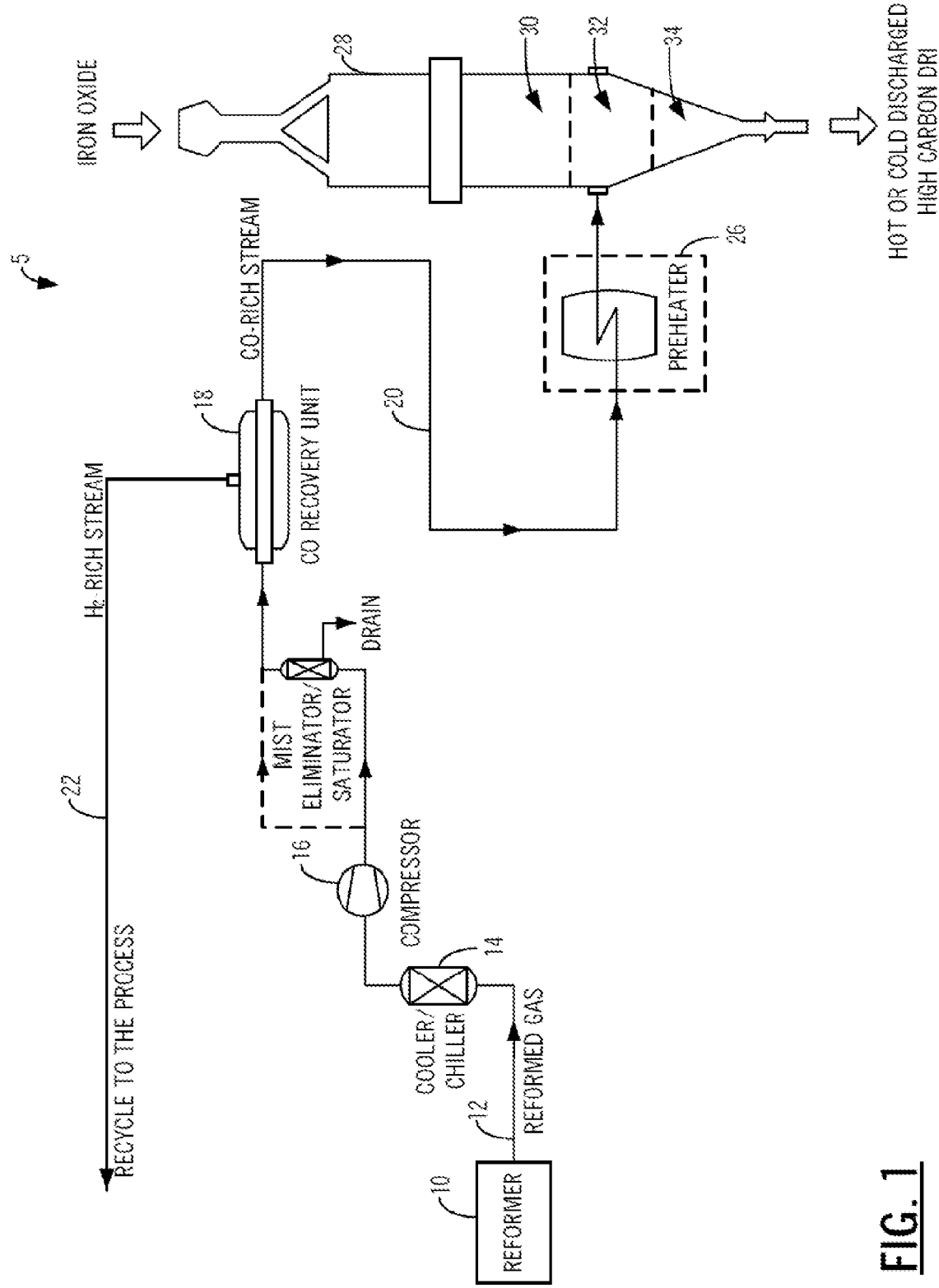
FIG. 1 is a schematic diagram illustrating one exemplary embodiment of the process for increasing the carbon content of sponge iron by injecting a carbon monoxide-rich stream into a reduction furnace of the present invention.

Referring now specifically to FIG. 1, in one exemplary embodiment, the process 5 of the present invention includes cooling at least a portion of the reformed gas derived from a reformer unit 10 of any design (such as a catalytic reformer (for example, a tubular reformer), a non-catalytic reformer (for example, a partial oxidation reactor), or a combination reformer (for example, an auto-thermal reformer or a two-stage reformer), or any other reducing gas generating unit capable of producing a CO-containing gas with a relatively high $CO/CO_2$ ratio) to close to ambient temperature (e.g. 30 degrees C.) using a cooler/chiller 14. Preferably, the reformed gas stream 12 contains at least 20.0% CO. The cooler/chiller 14 can utilize direct contact cooling, indirect contact cooling, refrigeration cooling, etc. During the cooling step, reformed gas will lose some of its water content, which in turn improves the carburization potential of the reformed gas. The cool/dry reformed gas optionally flows through a compressor 16 that boosts its pressure (to e.g. 15 barg), as most separation/adsorption methods works best at higher pressures. During the compression step, the gas loses even more water, resulting in further improved carburization potential.

The compressed gas, after optional temperature adjustment, flows into a system of membrane modules 18 for CO recovery. Any other kind of CO recovery mechanism can also be used for this step, like PSA/VPSA/TSA, refrigeration, etc. Following this step, the CO-rich gas stream 20 contains more than 60.0% CO, while the $H_2$-rich gas stream 22 may contain more than 70.0% $H_2$ correspondingly.

The CO-rich gas stream 20 coming from the CO recovery unit 18 is optionally passed through a preheater 26, which heats it to 50-300 degrees C. The CO-rich gas stream 20 is then introduced into the DR furnace 28 below the primary reduction zone 30 (e.g. into the transition zone 32 and/or the cooling zone 34), where the CO-rich gas stream 20 comes into contact with partially or completely reduced iron oxide and deposits carbon based on the well known reactions $2CO \Leftrightarrow C+CO_2$ and $3Fe+2CO \Leftrightarrow Fe_3C+CO_2$. In general, the partially or completely reduced iron oxide in the transition zone 32 and/or the cooling zone 34 contains 0.0%-3.0% combined carbon before, and up to 4.5% combined carbon after the CO-rich stream addition.

Further, the rejected gas 22 from the CO recovery unit 18 (rich in $H_2$) can be used in different portions of the DR plant as fuel, cooling gas, syngas, or process gas, or it can be exported to another facility.

Figure 2:
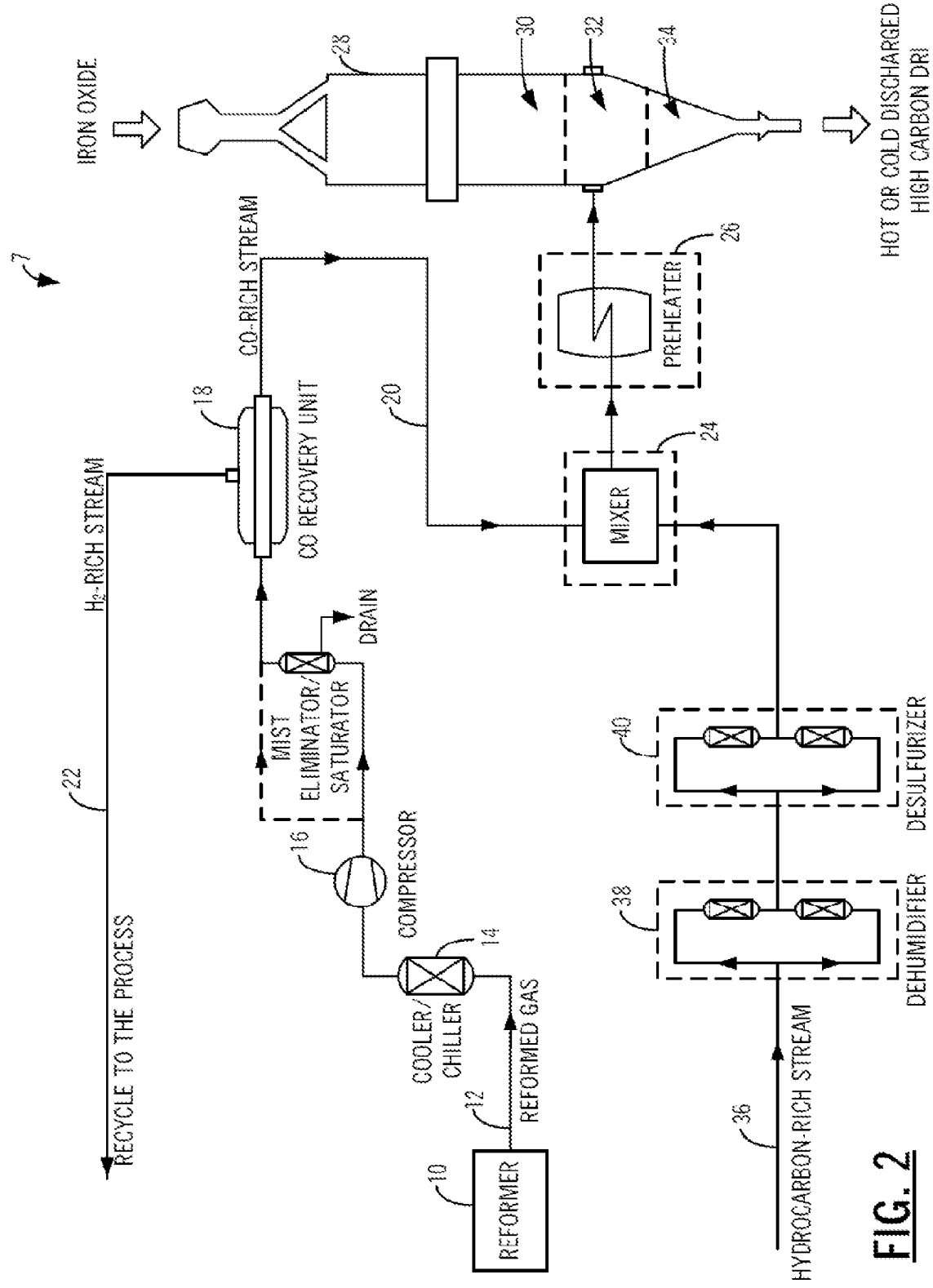
FIG. 2 is a schematic diagram illustrating another exemplary embodiment of the process for increasing the carbon content of sponge iron in a reduction furnace of the present invention, where a hydrocarbon-rich stream, with or without adjustment of its moisture and sulfur content, is blended with the carbon monoxide-rich stream of FIG. 1.

Referring to FIG. 2, in another exemplary embodiment the process 7 of the present invention includes cooling at least a portion of the reformed gas derived from a reformer unit 10 of any design (such as a catalytic reformer (for example, a tubular reformer), a non-catalytic reformer (for example, a partial oxidation reactor), or a combination reformer (for example, an auto-thermal reformer or a two-stage reformer), or any other reducing gas generating unit capable of producing a CO-containing gas with a relatively high $CO/CO_2$ ratio) to close to ambient temperature (e.g. 30 degrees C.) using a cooler/chiller 14. Preferably, the reformed gas stream 12 contains at least 20.0% CO. The cooler/chiller 14 can utilize direct contact cooling, indirect contact cooling, refrigeration cooling, etc. During the cooling step, reformed gas will lose some of its water content, which in turn improves the carburization potential of the reformed gas. The cool/dry reformed gas optionally flows through a compressor 16 that boosts its pressure (to e.g. 15 barg), as most separation/adsorption methods works best at higher pressures. During the compression step, the gas loses even more water, resulting in further improved carburization potential.

The compressed gas, after optional temperature adjustment, flows into a system of membrane modules 18 for CO recovery. Any other kind of CO recovery mechanism can also be used for this step, like PSA/VPSA/TSA, refrigeration, etc. Following this step, the CO-rich gas stream 20 contains more than 60.0% CO, while the $H_2$-rich gas stream 22 may contain more than 70.0% $H_2$ correspondingly.

The rejected gas 22 from the CO recovery unit 18 (rich in $H_2$) can be used in different portions of the DR plant as fuel, cooling gas, syngas, or process gas, or it can be exported to another facility.

Further, a hydrocarbon-rich gas stream 36 (natural gas, for example) is blended with the CO-rich gas stream 20 in a mixer 24 before both are introduced into the DR furnace 28. Optionally, if the hydrocarbon-rich stream is wet, one or more dehumidification units 38 can be used to make the gas dry for suppressing decarburization reactions. Optionally, if the hydrocarbon-rich stream is loaded with significant amount of sulfur compounds, one desulfurization unit 40 can be used to decrease and control the amount of total sulfur below 100 ppm, preferably, below 10 ppm, before flowing into the reduction furnace. In this case, the preheater 26 can be used to preheat the hydrocarbon-rich gas stream 36 prior to mixing the hydrocarbon-rich gas stream 36 with the CO-rich gas stream 20 in the mixer 24, and at a different temperature (e.g. about 350-400 degrees C.), such that soot formation is minimized as compared to preheating after the mixer 24 at a temperature of about 50-300 degrees C. Thus, the preheater 26 can alternatively be disposed before or after the mixer 24 in all embodiments.

Thus again, the present invention makes use of industrially available technologies, i.e. membrane module units (organic/organic/organometallic) by which a majority of the hydrogen and or $CO_2$ are recovered from a reformed gas stream in a plant via the rejection (i.e. separation) of other components. Such separation typically results in two different streams with distinct chemical compositions: one rich in CO and the other rich in $H_2$. The $H_2$-rich gas stream then blends with different gas streams in the process, including, but not limited to, the feed gas stream to the reformer unit, the cooling gas stream, the reducing gas stream, the fuel gas stream, etc. The CO-rich gas stream flows into the transition zone and/or the cooling zone of the reduction furnace to increase the carbon content of the sponge iron. The exothermic nature of reactions (4) and (7) above permits the addition of more gas into the transition zone to keep the temperature high. Optionally, a hydrocarbon-rich gas stream is blended with the CO-rich gas stream prior to the final injection port.

Hundreds of membrane modules have been installed around the world by different vendors in oil refineries and petrochemical plants, where the recovery of hydrogen, the separation of $CO_2$, or the adjustment of the $H_2/CO$ ratio is important for the efficient operation of the plant. Thus, there is little impediment to employing such equipment in a novel manner in a DR plant.

The present invention is not limited to the use of membrane modules. All other separation/adsorption technologies (e.g. pressure/vacuum or pressure/temperature swing adsorption (PSA/VPSA/TSA) units) meeting process requirements can be used to accomplish the carburization task of the present invention based on the guidelines presented.

Figure 3:
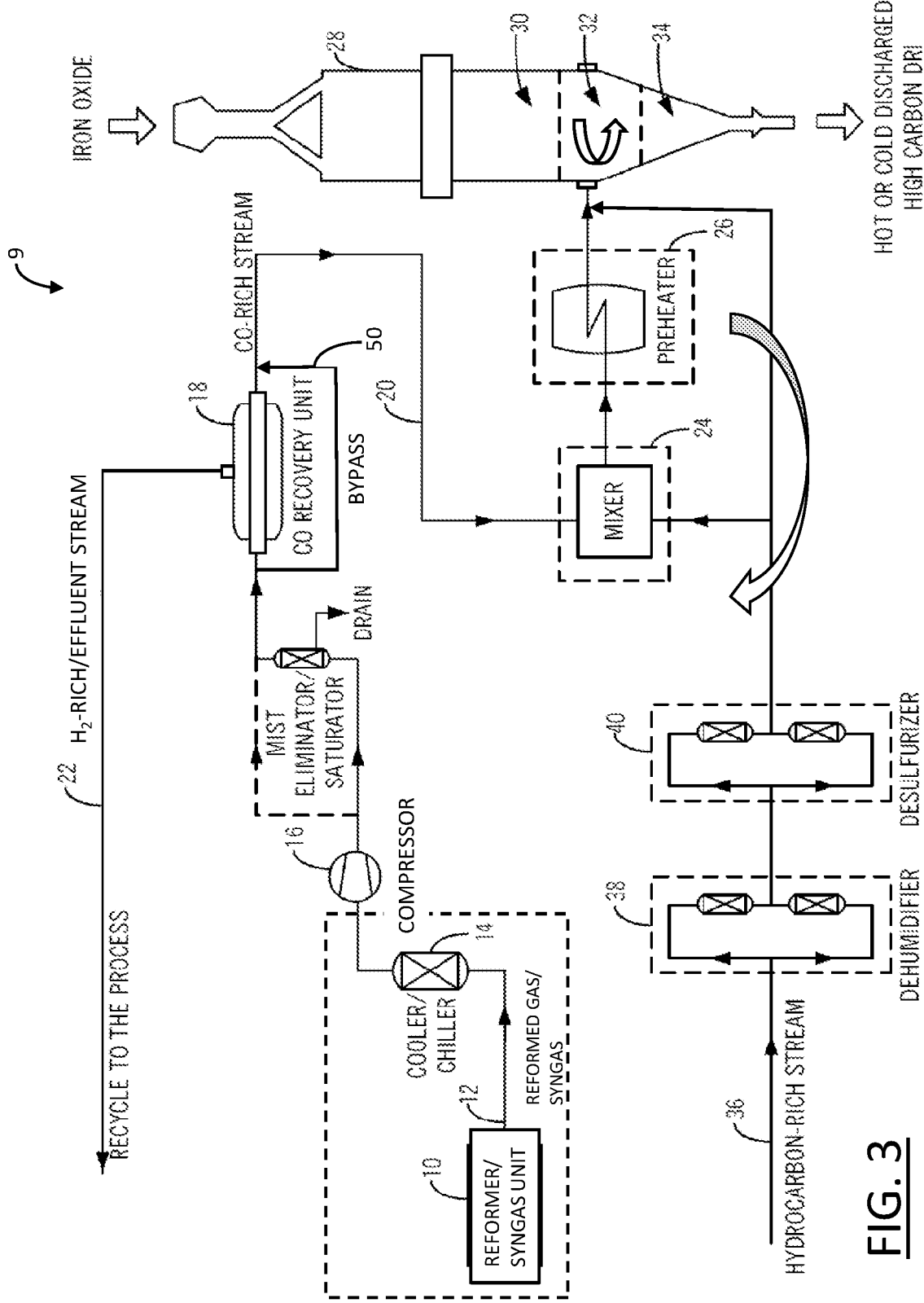
FIG. 3 is a schematic diagram illustrating a further exemplary embodiment of the process for increasing the carbon content of sponge iron in a reduction furnace of the present invention, optionally where a carbon monoxide recovery unit bypass is utilized, optionally utilizing reformer or other syngas source, and optionally where a hydrocarbon-rich stream, with or without adjustment of its moisture and sulfur content, is blended with the carbon monoxide-rich stream of FIGS. 1 and 2 and/or delivered directly to the transition zone and/or cooling zone of the reduction furnace.

FIG. 3 provides further refinements to the process 9 of the present invention. Optionally, the CO recovery unit 18 can be bypassed, in part or in whole, via a bypass line 50. A 30-60% bypass is the most likely scenario. However, lower or higher percentages are possible, anywhere from 0-100%, depending on the chemical composition of the reformed gas or syngas. If a 100% bypass is employed, then the compressor 16 can operate at about 2-7 barg, as opposed to 10-15 barg. However, if a 100% bypass is employed, then a drying unit (not illustrated) can be included along the bypass line 50. Optionally, the reformer 10 and reformed gas 12 (and the related components) can be replaced with gas from a coal gasifier or the like. It should be noted that the reformer 10 can be a catalytic reformer (for example, a tubular reformer), a non-catalytic reformer (for example, a partial oxidation reformer), or a combination reformer (for example, an auto-thermal reformer or two-stage reformer). The coal gasifier can be substituted with another type of gasifier, a coke oven gas source, an export gas source, a blast furnace, or the like—collectively referred to herein as a syngas source. Depending on the chemical composition of the syngas, a two-stage CO recovery unit 18 or the like is preferred to achieve the desired 35-70% CO-rich stream delivery to the transition zone 32 of the DR furnace 28. Optionally, the hydrocarbon-rich stream 36, with or without adjustment of its moisture via the dehumidifier 38 and sulfur content via the desulfurizer 40 and preheating via the preheater 26, is blended with the CO-rich stream 20 and/or delivered directly to the transition zone 32 and/or the cooling zone 34 of the DR furnace 28. Specifically, all transition zone/cooling injection may be via ports disposed about the circumference of the transition zone 32 and/or cooling zone 34 of the DR furnace 28. The key aspect is that it is partially or completely reduced iron oxide that is exposed to the CO-rich stream 20 and, optionally, the hydrocarbon-rich stream 36.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A method for producing direct reduced iron having increased carbon content, comprising:
provide a carbon monoxide-rich gas stream; and
delivering the carbon monoxide-rich gas stream to a direct reduction furnace and exposing partially or completely reduced iron oxide to the carbon monoxide-rich gas stream to increase the carbon content of resulting direct reduced iron;
wherein providing the carbon monoxide-rich gas stream comprises initially providing one of a reformed gas stream from a reformer and a syngas stream from a syngas source;
wherein the carbon monoxide-rich gas stream is derived from a carbon monoxide recovery unit that forms a portion of the carbon monoxide-rich gas stream and an effluent gas stream; and
wherein the carbon monoxide recovery unit is operated in parallel with a bypass line from which no effluent gas stream is removed, the carbon monoxide recovery unit and the bypass line each providing a portion of the carbon monoxide-rich gas stream, wherein 30-60% of the one of the reformed gas stream and the syngas stream is bypassed through the bypass line and the one of the reformed gas stream and the syngas stream is first compressed to 10-15 barg.

2. The method of claim 1, further comprising providing a hydrocarbon-rich gas stream to the direct reduction furnace with the carbon monoxide-rich gas stream.

3. The method of claim 1, further comprising providing a hydrocarbon-rich gas stream to one or more of a transition zone and a cooling zone of the direct reduction furnace.

4. The method of claim 1, wherein the carbon monoxide-rich gas stream comprises at least 60% CO by volume prior to being mixed with any other gas stream.

5. The method of claim 1, wherein the carbon monoxide-rich gas stream is delivered to one or more of a transition zone and a cooling zone of the direct reduction furnace.

6. The method of claim 1, wherein the carbon monoxide-rich gas stream leaving the carbon monoxide recovery unit comprises at least 60% CO by volume.

7. The method of claim 1, further comprising recycling the effluent gas stream for use in a direct reduction plant.

8. A system for producing direct reduced iron having increased carbon content, comprising:
means for providing a carbon monoxide-rich gas stream; and
means for delivering the carbon monoxide-rich gas stream to a direct reduction furnace and exposing partially or completely reduced iron oxide to the carbon monoxide-rich gas stream to increase the carbon content of resulting direct reduced iron;
wherein the means for providing the carbon monoxide-rich gas stream comprise one of a reformer for providing a reformed gas stream and a syngas source for providing a syngas stream
wherein the means for providing the carbon monoxide-rich gas stream comprise a carbon monoxide recovery unit that forms a portion of the carbon monoxide-rich gas stream and an effluent gas stream; and
wherein the carbon monoxide recovery unit is operated in parallel with a bypass line from which no effluent gas stream is removed, the carbon monoxide recovery unit and the bypass line each providing a portion of the carbon monoxide-rich gas stream, wherein, when 30-60% of the one of the reformed gas stream and the syngas stream is bypassed through the bypass line and the one of the reformed gas stream and the syngas stream is first compressed to 10-15 barg by a compressor.

9. The system of claim 8, further comprising a hydrocarbon source for providing a hydrocarbon-rich gas stream to the direct reduction furnace with the carbon monoxide-rich gas stream.

10. The system of claim 8, further comprising a hydrocarbon source for providing a hydrocarbon-rich gas stream to one or more of a transition zone and a cooling zone of the direct reduction furnace.

11. The system of claim 8, wherein the carbon monoxide-rich gas stream comprises at least 60% CO by volume prior to being mixed with any other gas stream.

12. The system of claim 8, wherein the carbon monoxide-rich gas stream is delivered to one or more of a transition zone and a cooling zone of the direct reduction furnace.

13. The system of claim 8, wherein the carbon monoxide-rich gas stream leaving the carbon monoxide recovery unit comprises at least 60% CO by volume.

14. The system of claim 8, further comprising means for recycling the effluent gas stream for use in a direct reduction plant.

* * * * *